(12) United States Patent
Park et al.

(10) Patent No.: US 9,128,654 B2
(45) Date of Patent: Sep. 8, 2015

(54) HOST APPARATUS CONNECTED TO IMAGE FORMING APPARATUS AND INFORMATION MANAGEMENT METHOD THEREOF

(75) Inventors: In-chang Park, Seoul (KR); Hyung-jong Kang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 216 days.

(21) Appl. No.: 12/817,311

(22) Filed: Jun. 17, 2010

(65) Prior Publication Data

US 2011/0080612 A1    Apr. 7, 2011

(30) Foreign Application Priority Data

Oct. 1, 2009    (KR) .................... 10-2009-0094001

(51) Int. Cl.
  *G06F 3/12*      (2006.01)
  *G06F 9/445*     (2006.01)
  *G06K 15/00*     (2006.01)

(52) U.S. Cl.
  CPC ............ *G06F 3/1285* (2013.01); *G06F 3/1207* (2013.01); *G06F 3/1229* (2013.01); *G06F 9/44505* (2013.01)

(58) Field of Classification Search
  CPC .............................. G06F 3/1207; G06F 3/1232
  USPC ........................................................ 358/1.15
  See application file for complete search history.

(56) References Cited

U.S. PATENT DOCUMENTS

| | | | |
|---|---|---|---|
| 8,286,167 B2 | 10/2012 | Takahashi | |
| 8,922,809 B2 | 12/2014 | Kang | |
| 2004/0223182 A1 | 11/2004 | Minagawa | |
| 2006/0077428 A1* | 4/2006 | Lovat et al. .................. | 358/1.15 |
| 2006/0139690 A1* | 6/2006 | Yagita .......................... | 358/1.15 |
| 2007/0279666 A1 | 12/2007 | Lee et al. | |
| 2008/0134179 A1* | 6/2008 | Takahashi .................... | 718/100 |
| 2010/0100586 A1 | 4/2010 | Bae | |

FOREIGN PATENT DOCUMENTS

| | | |
|---|---|---|
| JP | 2008-160809 | 7/2008 |
| KR | 1020050065993 | 6/2005 |

(Continued)

OTHER PUBLICATIONS

United States Office Action Issued on Sep. 25, 2012 in U.S. Appl. No. 12/662,161.

(Continued)

*Primary Examiner* — Dov Popovici
(74) *Attorney, Agent, or Firm* — Staas & Halsey LLP

(57) ABSTRACT

An information management method of a host apparatus which is connected to at least one image forming apparatus includes executing an integrated administration program which is installed in the host apparatus and integrally manages at least one application, receiving device information of at least one image forming apparatus, storing the received device information of the image forming apparatus, executing one of applications which are managed by the integrated administration program, loading the stored device information corresponding to the executed application; and performing a function of the application by using the loaded device information. With this, the method efficiently uses a storage space and improve user's convenience.

26 Claims, 18 Drawing Sheets

(56) References Cited

FOREIGN PATENT DOCUMENTS

| KR | 10-2007-0082207 | 8/2007 |
|---|---|---|
| KR | 10-2007-0114967 | 12/2007 |

OTHER PUBLICATIONS

Extended European Search Report dated Dec. 10, 2012 issued in EP Application No. 10162048.2.
United States Non-Final Office Action dated Sep. 3, 2013 issued in U.S. Appl. No. 12/662,161.
United States Final Office Action dated Mar. 27, 2014 issued in U.S. Appl. No. 12/662,161.
US Interview Summary issued Jul. 15, 2013 in U.S. Appl. No. 12/662,161.
US Office Action issued May 24, 2013 in U.S. Appl. No. 12/662,161.
US Corrected Notice of Allowability issued Dec. 29, 2014 in U.S. Appl. No. 12/662,161.
US Notice of Allowance issued Jun. 9, 2014 in U.S. Appl. No. 12/662,161.
Declarations Under 37 C.F.R. § 1.131 dated Jan. 2013, submitted with attachments in U.S. Appl. No. 12/662,161.
Korean Office Action dated Jan. 30, 2015 in Korean Patent Application No. 10-2009-0094001, 14 pages including Partial Translation.
Korean Notice of Allowance dated Jan. 28, 2015 in Korean Patent Application No. 10-2009-0082145, 3 pages including Partial Translation.
"(IDS) (DPU) (direct print utility)" Google Search dated May 20, 2013.
U.S. Appl. No. 12/662,161, filed Apr. 1, 2010, Hyung-Jong Kang, Samsung Electronics Co., Ltd.

* cited by examiner

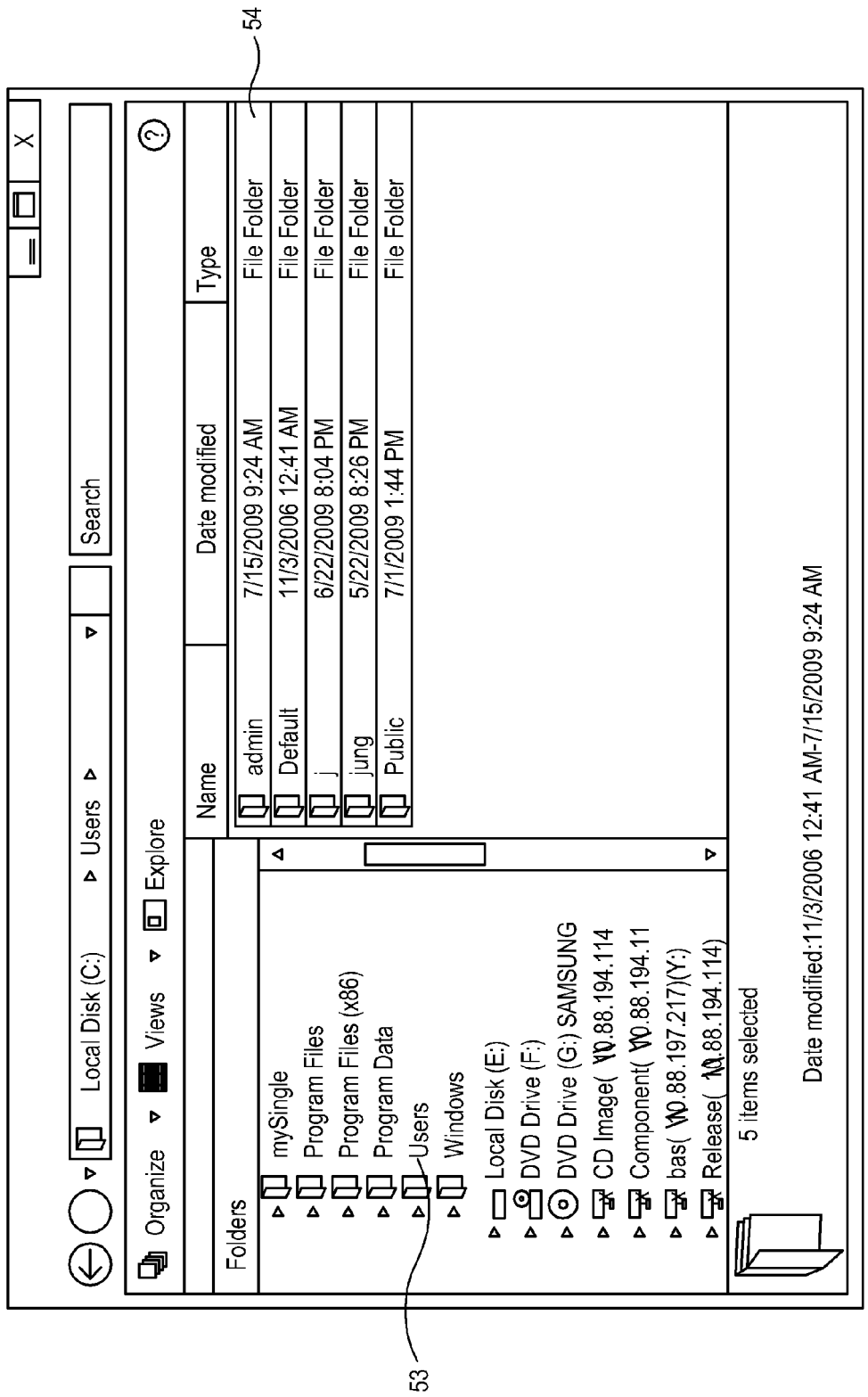

FIG. 13

| Printer Alert | E-mail Alert |
|---|---|

How Often showing

○ Off
○ Anytime(All printers)
⊙ On Printing(Only I use)

When Notification

☑ When Printing is in progress
☑ When Printer a problem, but can continue ex)Toner Low
☑ When Printer cannot print ex)Paper Jam How to showing ☑ Pop-up Message
☑ Tray Icon

— 28

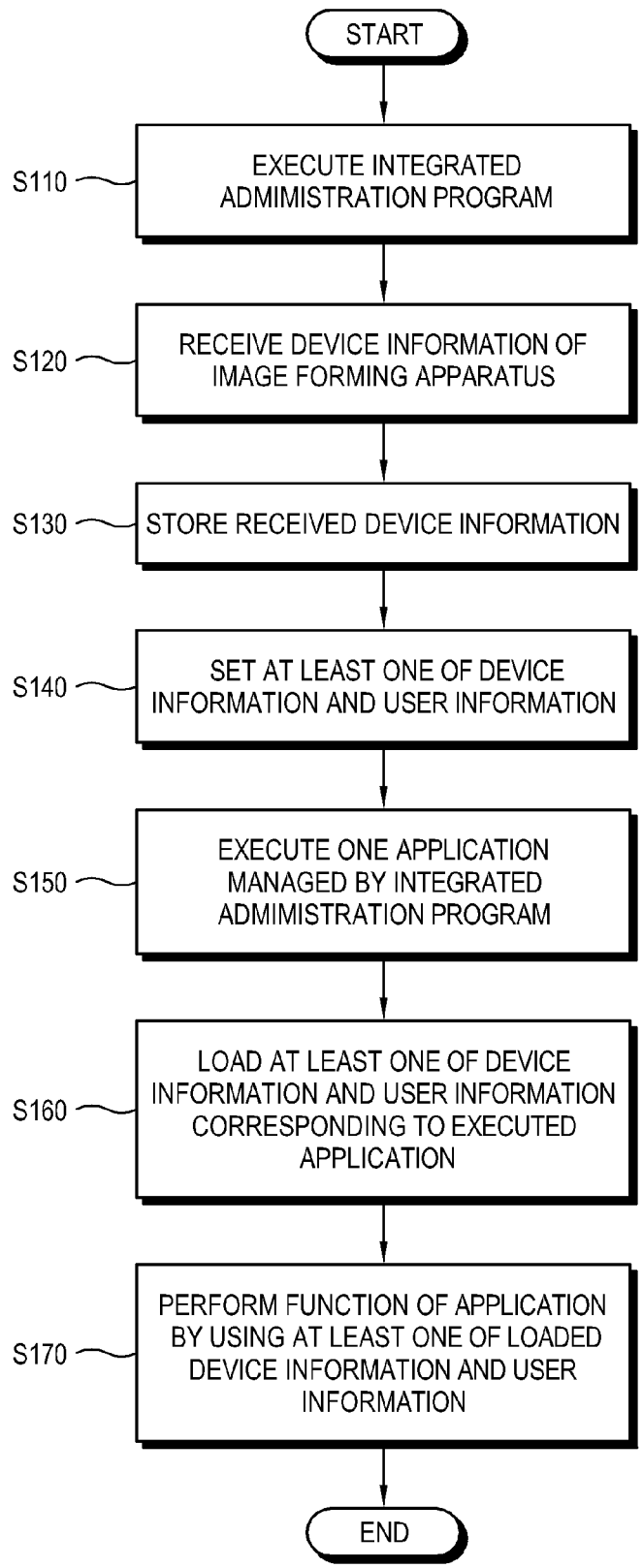

HOST APPARATUS CONNECTED TO IMAGE FORMING APPARATUS AND INFORMATION MANAGEMENT METHOD THEREOF

CROSS-REFERENCE TO RELATED APPLICATIONS

This application claims priority under 35 U.S.C. §119(a) from Korean Patent Application No. 10-2009-0094001, filed on Oct. 1, 2009, in the Korean Intellectual Property Office, the disclosure of which is incorporated herein by reference in its entirety.

BACKGROUND

1. Field of the Invention

Apparatuses and methods consistent with the present general inventive concept relate to a host apparatus connected to an image forming apparatus and an information management method thereof, and more particularly, to a host apparatus and an information management method thereof which stores and manages device information and user information of an image forming apparatus by using an integrated application program integrally managing at least one application.

2. Description of the Related Art

An image forming apparatus forms an image on a print paper. The image forming apparatus may include a printer, a photocopier, a facsimile, a multi-function device which has at least two functions, etc.

Recently, demand for an image forming apparatus as an office automation device performing not only a document print function but also a scanning function and faxing function has increased. Accordingly, the image forming apparatus has extended its original functions to perform various functions with high performance.

To more efficiently manage an image forming apparatus connected in a network, a user (or administrator) uses a host apparatus such as a personal computer (PC) to set and manage devices, i.e., image forming apparatus.

Thus, various applications are installed in the host apparatus to use various functions of the image forming apparatus, enabling a user to use the functions of the image forming apparatus by executing the applications.

The host apparatus manages and stores information corresponding to the image forming apparatus ("device information") and information corresponding to a user who uses the image forming apparatus ("user information") for each application.

In case of sharing information which can be shared by a plurality of applications, a conventional host apparatus which stores information per application stores the sharing information in a predetermined area corresponding to an application. Then, the sharing information is copied and stored in another storage area by another application.

Then, the same sharing information is stored in several storage areas of each application. That is, more various the types of applications are, the more storage space is needed to store the same information.

SUMMARY

Accordingly, it is a feature of the present general inventive concept to provide a host apparatus connected to an image forming apparatus and an information management method thereof which stores device information and user information by an integrated application program to integrally manage a plurality of applications, and which loads and uses stored information with an application programming interface (API) function when executing each application to thereby efficiently use storage space and enhance user's convenience.

Additional features and/or utilities of the present general inventive concept will be set forth in part in the description which follows and, in part, will be obvious from the description, or may be learned by practice of the present general inventive concept.

Features and/or utilizes of the present general inventive concept may be realized by an information management method of a host apparatus which is connected to at least one image forming apparatus, the method including executing an integrated administration program which is installed in the host apparatus and integrally manages at least one application, receiving device information of at least one image forming apparatus, storing the received device information of the image forming apparatus, executing one of applications which are managed by the integrated administration program, loading the stored device information corresponding to the executed application, and performing a function of the application by using the loaded device information.

The method may further include setting the device information and the user information, wherein the loading the information may include loading at least one of the set device information and the user information.

The loading the information may include calling an application programming interface (API), and loading at least one of the device information and the user information by using the called API.

The device information may include status information on at least one image forming apparatus and setting information on a function of at least one image forming apparatus.

The user information may include at least one of user ID and password information, alert settings information, and job accounting information.

The set user information may be stored in a user's account folder.

The storing the device information may include updating stored device information.

The application may include a printer driver corresponding to a predetermined image forming apparatus.

Features and/or utilizes of the present general inventive concept may also be realized by a host apparatus which is connected to a plurality of image forming apparatuses and has an integrated administration program installed therein, the host apparatus including a user interface unit which executes the integrated administration program and an application managed by the integrated administration program, a communication unit which receives device information of at least one image forming apparatus, a storage unit which stores therein the received device information of the image forming apparatus, and a controller which controls the communication unit to receive the device information upon an execution of the integrated administration program, loads the device information from the storage unit corresponding to the executed application, and performs a function of the application by using the loaded device information.

The user interface unit may set the device information and the user information, and the controller may load at least one of the set device information and the user information from the storage unit.

The controller may call an application programming interface (API) and load at least one of the device information and the user information by using the called API.

The device information may include status information on at least one image forming apparatus and setting information on a function of at least one image forming apparatus.

The user information may include at least one of user ID and password information, alert settings information and job accounting information.

The storage unit may store the set user information in a user's account only folder.

The controller may update the device information stored in the storage unit.

The application may include a printer driver corresponding to a predetermined image forming apparatus.

Features and/or utilities of the present general inventive concept may also be realized by a method of storing image forming apparatus data including executing an integrated administration program on a host device to control a plurality of functions of at least one image-forming apparatus, receiving image-forming apparatus data from the at least one image-forming apparatus in response to a request from the integrated administration program of the host apparatus, and storing the image-forming apparatus data in the host device.

The method may include executing at least one function of the plurality of functions of the at least one image-forming apparatus and retrieving the stored image-forming apparatus data to execute the at least one function.

The method may include displaying the stored image-forming apparatus data on a display of the host device.

The method may include receiving user data and storing the user data in the host device.

The method may include executing at least one function of the plurality of functions of the at least one image-forming apparatus and retrieving the stored image-forming apparatus data and the stored user data to execute the at least one function.

The method may include performing a plurality of functions of the at least one image-forming apparatus and retrieving the stored image-forming apparatus data and the stored user data from the host device to execute each function.

The integrated administration program may retrieve the stored image-forming apparatus data and user data from a single location within the host device to execute each function.

The integrated administration program may store the image-forming apparatus data at a single location in memory of the host device so that each of the plurality of functions of the image-forming apparatus accesses the image-forming apparatus data from the same single location in memory.

The at least one image-forming apparatus may include a plurality of image-forming apparatuses, receiving image-forming apparatus data from the at least one image-forming apparatus in response to a request from the integrated administration program of the host apparatus may include receiving image-forming apparatus data from each of the plurality of image-forming apparatuses, and storing the image-forming apparatus data in the host device may include storing the image-forming apparatus data corresponding to each of the image-forming apparatuses in the host device.

Features and/or utilities of the present general inventive concept may also be realized by a host device to control at least one image-forming apparatus including a data storage device to store user data and image-forming apparatus data, a communication unit to transmit data to and receive data from at least one image-forming apparatus connected to the host device, and a first controller to control operation of the communication unit to request image-forming apparatus data from the at least one image-forming apparatus and to transmit image-forming apparatus data to the data storage device.

The data storage device may store an integrated administration program and the first controller may use the integrated administration program to retrieve the user data and image-forming apparatus data from the data storage device to perform a plurality of functions of the connected at least one image-forming apparatus.

The host device may include a display device to display a graphical user interface corresponding to the integrated administration program.

The controller may perform the plurality of functions of the at least one image-forming apparatus in response to a user interaction with the graphical user interface displayed on the display device. The host device may include a user interface unit to receive a user input corresponding to the user data.

The data storage device may store the user data and the image-forming apparatus data at a single location in memory so that each of the plurality of functions of the at least one image-forming apparatus access the user data and the image-forming apparatus data from the same single location in memory.

Features and/or utilities of the present general inventive concept may also be realized by an image-forming system including at least one image-forming apparatus, and a host device connected to the at least one image-forming apparatus to control an image-forming operation of the image-forming apparatus.

The at least one image-forming apparatus may include a plurality of image-forming apparatuses, and the data storage device may store image-forming apparatus data corresponding to each of the plurality of image-forming apparatuses.

The image-forming system may include a server to store image-forming apparatus data from the at least one image-forming apparatus and to transmit the image-forming apparatus data to the host device in response to a data request.

Features and/or utilities of the present general inventive concept may also be realized by a computer-readable medium having stored thereon a computer program to perform a method of storing image forming apparatus data on a host device, the method including executing an integrated administration program on the host device to control a plurality of functions of at least one image-forming apparatus, receiving image-forming apparatus data from the at least one image-forming apparatus in response to a request from the integrated administration program of the host apparatus, and storing the image-forming apparatus data in the host device.

BRIEF DESCRIPTION OF THE DRAWINGS

The above and/or other aspects of the present general inventive concept will become apparent and more readily appreciated from the following description of the embodiments, taken in conjunction with the accompanying drawings of which:

FIG. 7 illustrates an example of user information stored in the host apparatus according to an exemplary embodiment of the present general inventive concept;

FIGS. 13 to 15 illustrate examples of loading both device information and user information; and FIG. 16 is a flowchart which illustrates an information management method of the host apparatus according to an exemplary embodiment of the present general inventive concept.

DETAILED DESCRIPTION OF THE EMBODIMENTS

Figure 1:
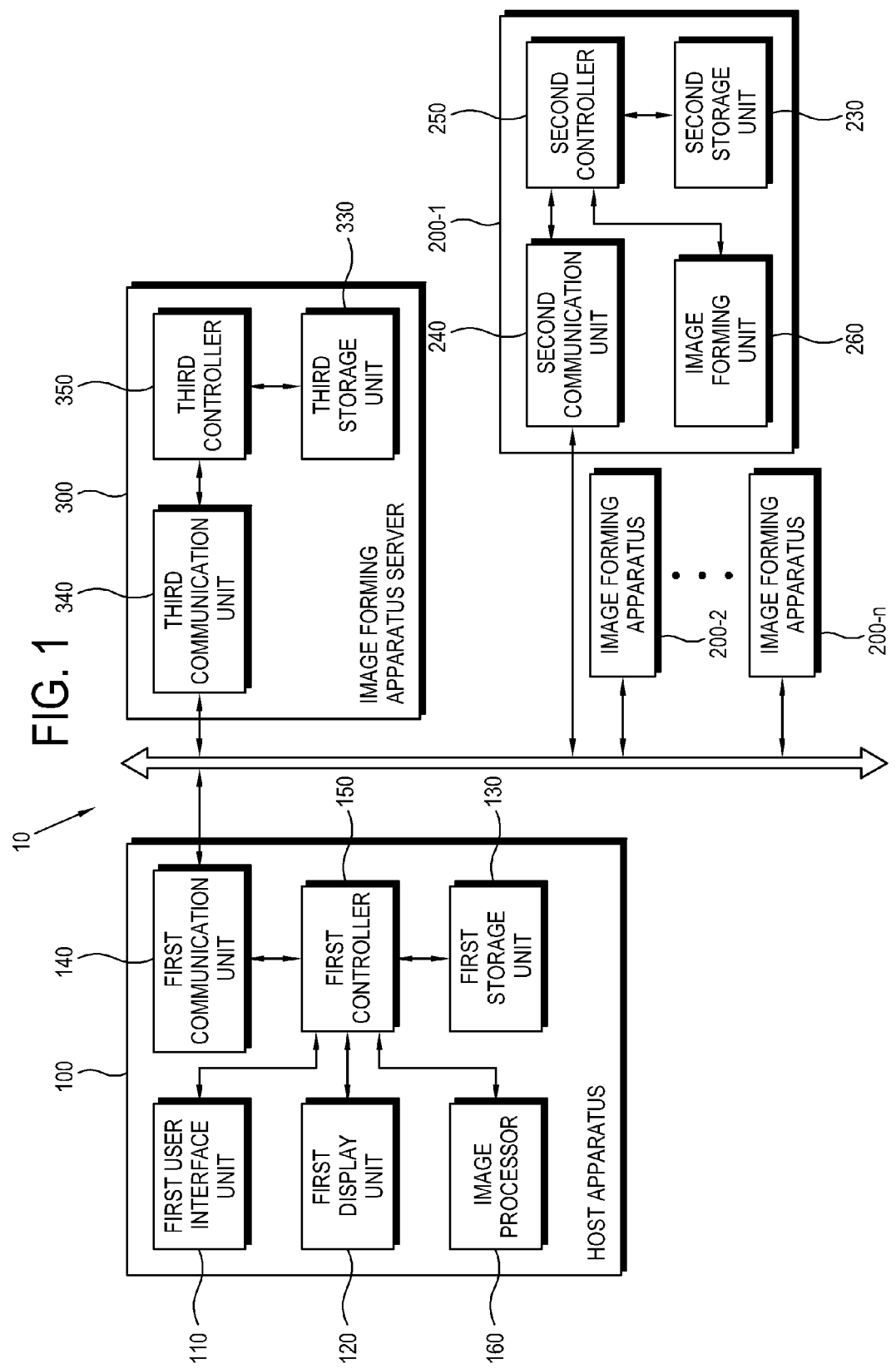
FIG. 1 is a block diagram of a host apparatus and an image forming system comprising the same according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image forming system 10 which includes a host apparatus 100 according to an exemplary embodiment of the present general inventive concept.

As shown therein, the image forming system 10 according to the present general inventive concept may include the host apparatus 100, at least one of image forming apparatuses 200-1, 200-2, ..., and 200-n, and an image forming apparatus server 300. The image forming apparatus server 300 may be provided separately, as illustrated in FIG. 1, it may be included in the host apparatus 100, or it may be omitted altogether.

According to an exemplary embodiment of the present general inventive concept, if the image forming apparatus server 300 is omitted, the host apparatus 100 is connected to at least one of the image forming apparatuses 200-1, 200-2, ... and 200-n to receive device information from the image forming apparatus and to transmit image data to the image forming apparatus.

The host apparatus 100 may include a personal computer (PC) and the image forming apparatuses 200-1, 200-2, ..., and 200-n may include a printer or a multi-function device connected in a network, by a local connection, in parallel, or by UNC and including an image forming unit 260 to perform a print operation according to a print command from the host apparatus 100.

The print operation may include a print operation to copy a scanned document, a print operation to print received fax data, and a print operation to print data received from an external device via the host apparatus 100, such as from a server. The print operation may also be to print data stored in a data storage device located inside the host device 100 or an image forming apparatus 200, such as a hard disk drive or outside the host device 100 or an image forming apparatus 200, such as a USB memory stick.

The image forming apparatuses 200-1, 200-2 ... and 200-n according to the present general inventive concept may be connected to the host apparatus 100 by a local connection or shared as a network image forming apparatus having their own IP addresses assigned in a network.

If the image forming apparatuses 200-1, 200-2, ... and 200-n are connected by a local connection to the host apparatus 100, the host apparatus 100 may include the image forming apparatus server 300.

If the image forming apparatuses 200-1, 200-2, ... and 200-n are network image forming apparatuses, the image forming apparatus server 300 may be provided separately to manage at least one of the image forming apparatuses 200-1, 200-2, ... and 200-n. The host apparatus 100 may receive various information on at least one of the image forming apparatuses 200-1, 200-2, ... and 200-n from the image forming apparatus server 300.

According to an exemplary embodiment of the present general inventive concept, a device integrated administration program, or an integrated desktop solution (IDS), may be installed in the host apparatus 100 to integrally manage at least one of the image forming apparatuses 200-1, 200-2, ... and 200-n. The IDS may integrally manage an integrated printer driver (or universal printer driver) depending on the type of the image forming apparatuses 200-1, 200-2, ... and 200-n and various applications to enhance functions of the image forming apparatuses 200-1, 200-2, ... and 200-n.

A user may execute at least one application (including a printer driver, but not limited thereto) by using the integrated administration program, may input various setting values for the image forming apparatuses 200-1, 200-2, ... and 200-n through the executed application, and may control the image forming apparatuses 200-1, 200-2, ... and 200-n to perform imaging functions.

The integrated administration program which is installed in the host apparatus 100 according to the exemplary embodiment of the present general inventive concept integrally manages at least one application to enhance functions of the image forming apparatuses 200-1, 200-2, ... and 200-n. To support the foregoing function, the host apparatus 100 stores therein device information of the image forming apparatuses 200-1, 200-2, ... and 200-n and user information on a user using the integrated administration program. A user may include an administrator, for example, or a user having permission on the host apparatus 100 to change settings of the host apparatus 100.

As illustrated in FIG. 1, the host apparatus 100 includes a first user interface unit 110, a first display unit 120, a first storage unit 130, a first communication unit 140, a first controller 150, and an image processor 160.

The first user interface unit 110 receives various commands from a user. The first user interface 110 may include a keyboard, mouse, touch-pad, or other device to receive input from a user.

A user may use the first user interface unit 110 to enter a command to execute the integrated administration program, or integrated desktop solution (IDS), to integrally manage the device. Specifically, the user may use the single IDS to operate the plurality of image forming apparatuses 200-1, 200-2, ... and 200-n, to select one of the image forming apparatuses 200-1, 200-2, ... and 200-n displayed in an image forming apparatus list 21 of the management screen 20 displayed on the first display unit 120 (to be described later)

corresponding to the execution of the IDS, or to select one of applications managed by the IDS.

A user may log into the IDS through the first user interface unit 110. For example, a user may log in an administrator mode which enables the user to setup and change of any most or all of the settings associated with the image forming apparatuses 200-1, 200-2, . . . and 200-n. The user may input a user ID and password, such as an administrator ID and password, into the first user interface unit 110, and the first controller 150 may authenticate the user. The integrated administration program, or an integrated desktop solution (IDS), may be configured to only be accessed or have settings changed by an administrator. Alternatively, various settings of the IDS may be changeable by users having less access than an administrator.

In addition to an input device, such as a keyboard or mouse, the first user interface unit 110 may also include a graphic user interface (GUI) which may be generated by executing a driver or an additional application. The GUI may be displayed on the first display unit 120. The GUI may include an icon, a button, or a text input window to be selected by a user.

If the first user interface unit 110 includes a GUI, the host apparatus 100 executes the IDS and receives various commands from a user corresponding to the management screen 20 displayed on the first display unit 120.

The first display unit 120 may display the management screen 20 of at least one of the image forming apparatuses 200-1, 200-2, . . . and 200-n which is connected to the host apparatus 100. The first display unit 120 may be any type of display unit including a CRT monitor, an LED monitor, a TV, a thin film transistor-liquid crystal display (TFT-LCD) and a driver (not shown) to drive the TFT-LCD, or any other display device.

Figure 2:
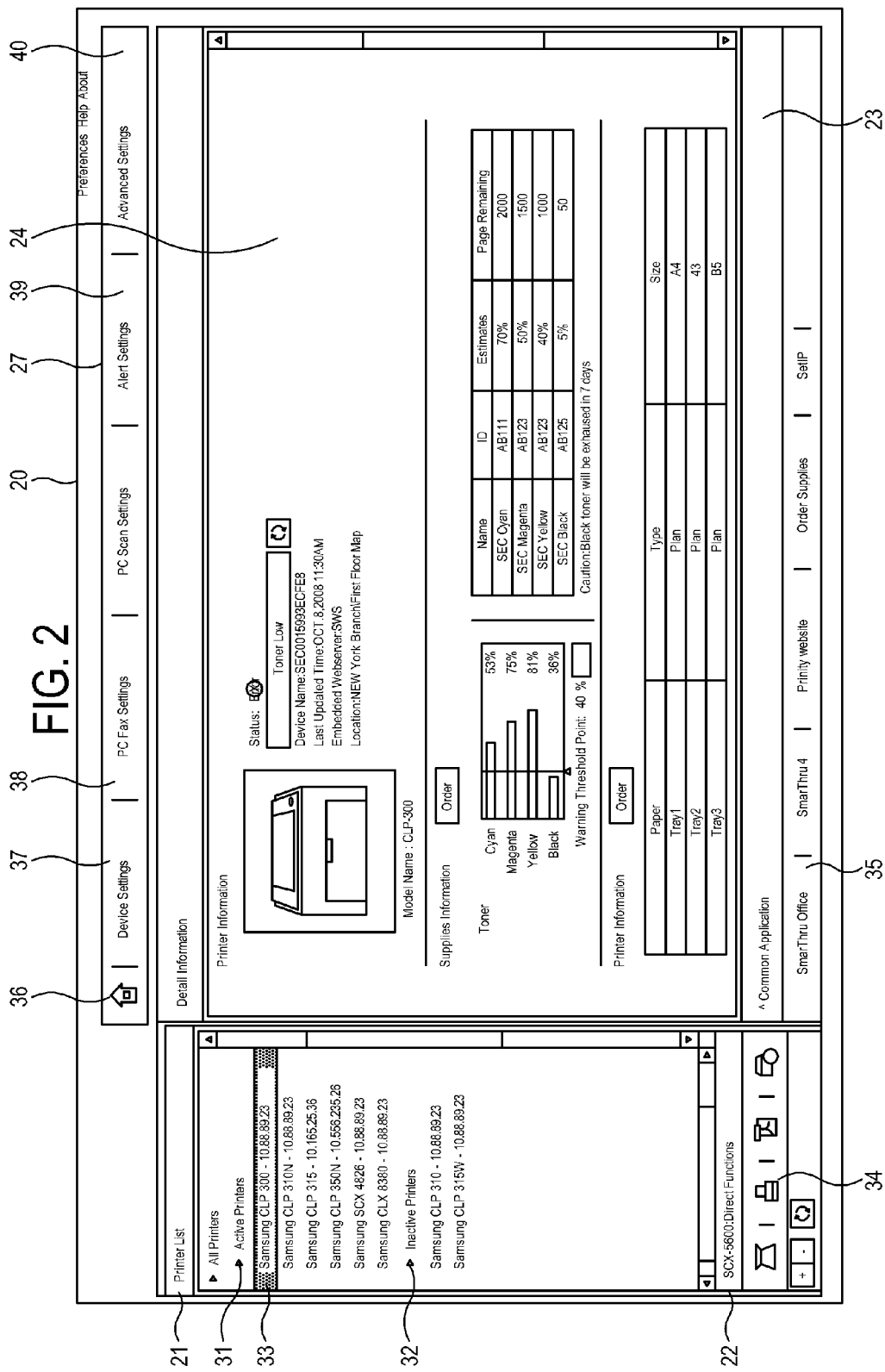
FIG. 2 illustrates an example of a management screen according to an exemplary embodiment of the present general inventive concept.

FIG. 2 illustrates an example of a management screen 20 according to an exemplary embodiment of the present general inventive concept.

If a user executes the integrated administration program, or an integrated desktop solution (IDS), to configure or operate an image forming apparatuses 200-1, 200-2, . . . and 200-n, the first display unit 120 may display thereon the management screen 20 of the IDS corresponding to the selected image forming apparatus, as illustrated in FIG. 2.

The management screen 20 may include a device list area 21 to display a list of the image forming apparatuses 200-1, 200-2, . . . and 200-n, an inherent function area 22 to display an icon corresponding to at least one application supported by the host apparatus 100 through the IDS, a common function area 23 to display an icon corresponding to at least one application supported by the host apparatus 100 through the IDS, regardless of a compatibility with the image forming apparatuses 200-1, 200-2, . . . and 200-n, and a contents area 24 to display status information of a predetermined image forming apparatus.

Information which is displayed in the inherent function area 22 and the contents area 24 includes information corresponding to an image forming apparatus 33 selected from the device list area 21.

The device list area 21 displays a list of the image forming apparatuses 200-1, 200-2, . . . and 200-n connected to the host apparatus 100. The first controller 150 may determine the image forming apparatuses 200-1, 200-2, . . . and 200-n that are connected in a network by using a printer driver installed in the host apparatus 100 or the first communication unit 140, for example.

The first controller 150 may include a processor, memory, and supporting logic to control operations of the first user interface unit 110, first display unit 120, first storage unit 130 or data storage unit, first communication unit 140, image processor 160, and any other functional units of the host device 100. In addition, one or more of the functional units of the host device 100 may include dedicated processors, memory, and logic circuits to control respective functional operations. For example, the image processor 160 may include a processor and/or memory to perform image processing and to transmit and receive image data to and from the first controller 150.

The image processor 160 may generate print data in a predetermined print language according to a print command through the first user interface unit 110. The generated print data are transmitted to one of the image forming apparatuses 200-1, 200-2, . . . and 200-n through the first communication unit 140. The image forming apparatuses 200-1, 200-2, . . . and 200-n receive the print data from the host apparatus 100 and perform a print operation.

The first communication unit 140 may include one or more data ports to communicate with external devices. The data ports may be wired ports, such as USB, Ethernet, telephone, or other wired ports, or may include wireless ports, such as a wireless network transceiver to transmit and/or receive data via an antenna.

Referring to FIG. 2, the device list area 21 displayed on the first display unit 120 may classify the image forming apparatuses 200-1, 200-2, . . . and 200-n into active printers 31 and inactive printers 32 depending on the current status of the respective image forming apparatuses detected by the first controller 150. That is, an image forming apparatus that has had a corresponding driver or software installed in the host apparatus 100 and that is not available may be listed up as "inactive."

A user may select one of the image forming apparatuses displayed on the device list area 21 via the first user interface unit 110. The management screen 20 displayed on the first display unit 120 may provide information about the selected image forming apparatus 33 in the inherent function area 22 and the contents area 24.

The inherent function area 22 may display a model name of the image forming apparatus 33 selected from the device list area 21 and an icon 34 corresponding to one or more applications to control functions of the selected image forming apparatus. For example, in FIG. 2, the inherent function area 22 displays icons 34 to perform a print operation, a conversion to .pdf, and a scan-to-email function.

The inherent function area 22 may display the icon 34 of each application as "enabled" or "disabled" depending on whether the host device 100 is compatible with the particular application to control the selected image forming apparatus 33, or whether the selected image forming apparatus 33 is capable of performing the function associated with the particular icon 34. For example, if the selected image forming apparatus 33 is unable to scan a document to an email address, the "scan-to-email" icon may be partially covered by a symbol representing "disabled."

The common function area 23 may include an icon 35 corresponding to at least one application managed by the host apparatus 100 through the integrated administration program, or integrated desktop solution (IDS). The common function area 23 may display an icon 35 which is enabled or disabled depending on support of the host apparatus 100, or depending upon whether the application has been installed in the host apparatus 100.

The first controller 150 may determine whether applications corresponding to the icons 34 and 35 of the inherent function area 22 or the common function area 23 are installed in the host device 100 by using registry information stored in the first storage unit 140. The first storage unit 140 is a data storage device, and may include any type of data storage device including non-volatile memory, volatile or dynamic memory, a hard disk, or any combination of memory devices.

The contents area 24 may include device information of the selected image forming apparatus 33 and information corresponding to the user that is presently logged in to the IDS. The device information may include status information of the image forming apparatus and setting information set by a user corresponding to settings of the image forming apparatus.

The contents area 24 may also display a status message indicating the current status of the selected image forming apparatus 33, supplies information such as information regarding toner type and quantity, paper and tray information, and network status information as an example of the status information of the selected image forming apparatus.

A user may select one of menu items 27 provided in an upper part of the management screen 20 and execute an application to confirm or set device information and user information of a selected image forming apparatus 33.

The menu item 27 may include icons corresponding to Home 36, Device Settings 37, PC FAX Settings 38, Alert Settings 39, Advanced Settings 40, etc.

If a user selects the Home icon 36, the contents area 24 may display status information as illustrated in FIG. 2.

If a user selects the Device Settings icon, the contents area 24 may display settings of the device information of the image forming apparatus 33 to confirm and change the settings. If a user selects the Alert Settings icon, the contents area 24 may display an error status of the selected image forming apparatus 33. If a user selects the Advanced Settings icon 40, the contents area 24 may display information such as Job Accounting, Alert History, etc.

The device information and the user information which are displayed in the contents area 24 may be separately stored in different areas of the first storage unit 130.

Figure 3:
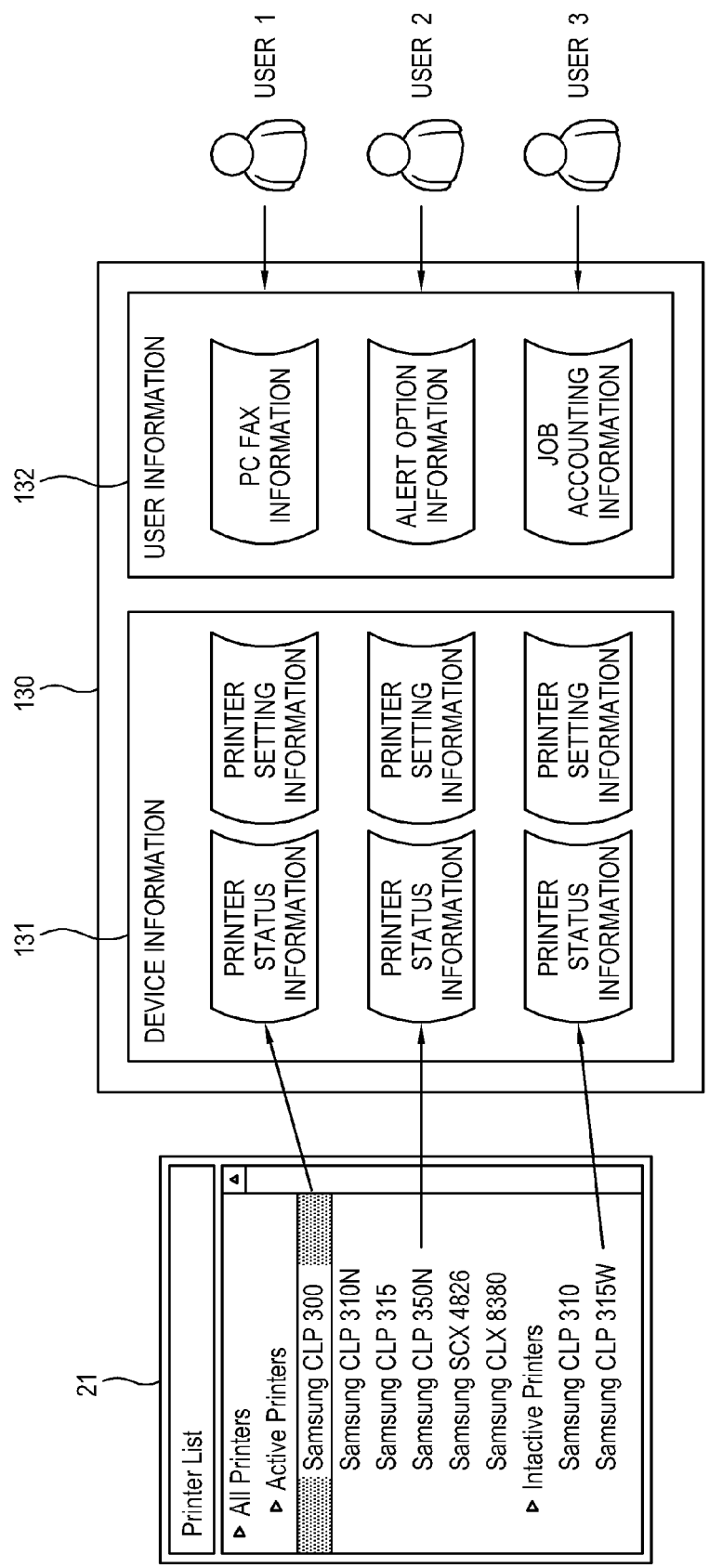
FIG. 3 illustrates a storage area of device information and user information of the host apparatus according to an exemplary embodiment of the present general inventive concept.

FIG. 3 illustrates that the device information and the user information may be stored in different storage areas 131 and 132, respectively. The first storage unit 130 may include a device information storage area 131 which stores device information of at least one of the image forming apparatuses 200-1, 200-2, . . . and 200-n, and a user information storage area 132 which stores information of at least one user using the IDS.

The device information storage area 131 stores status information and setting information of the image forming apparatuses 200-1, 200-2, . . . and 200-n. The device information may be inherent information of an image forming apparatus, or information that corresponds particularly to one image forming apparatus and not necessarily to another image forming apparatus. For example, the device information may include current toner level information and print setting information of a predetermined image forming apparatus.

Figure 6:
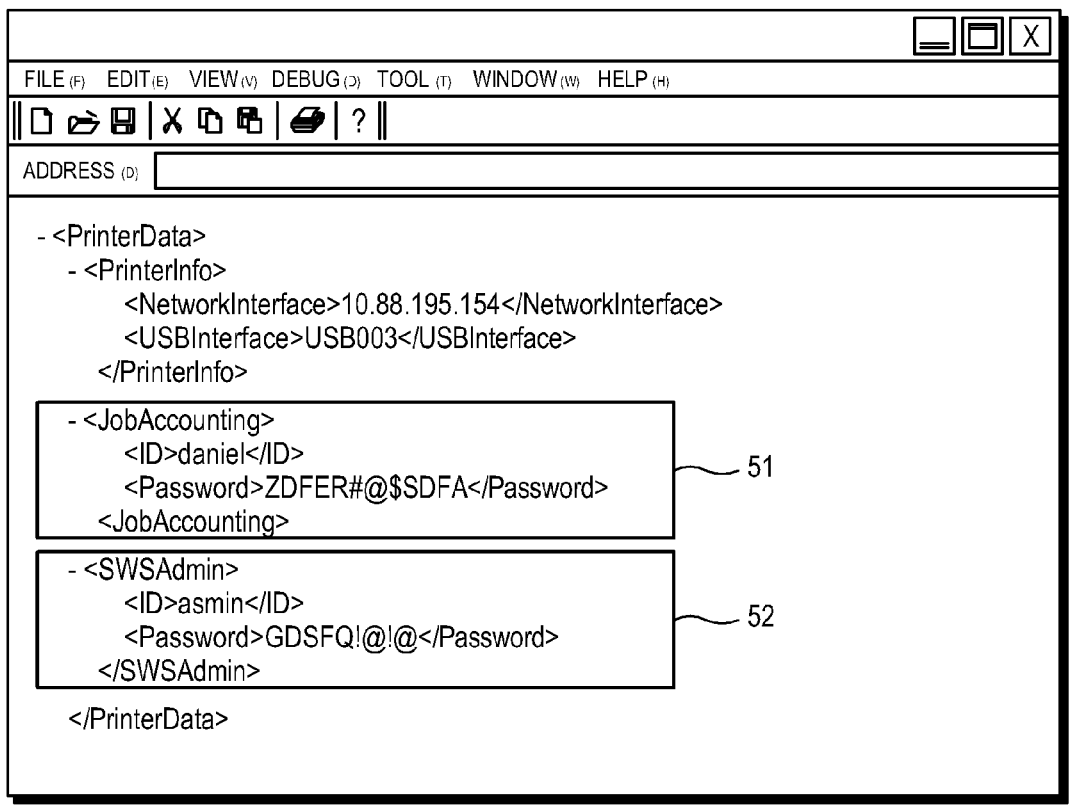
FIG. 6 illustrates an example of stored user information according to an exemplary embodiment of the present general inventive concept.

The user information storage area 132 may store data that corresponds to a specific user. For example, if a user selects the "Alert Settings" icon 39 of FIG. 2 and adjusts the alert settings, the user information stored in the user information storage area may include data corresponding to the alert settings. The user information may be organized according to user and may be kept confidential from other users. As illustrated in FIG. 6, the user information may include ID and password information 51 on the job accounting, and administrator ID and password information 52. Each of password information is encoded and stored.

FIG. 6 illustrates an example of stored user information according to an exemplary embodiment of the present general inventive concept.

The user information may include data which may be applied to one or more of the image forming apparatuses 200-1, 200-2, . . . and 200-n and information which varies depending on a user. For example, the user information may include user's ID and password information, job accounting information, and preferred image forming apparatus settings such as alert settings. The user information may include authentication information to authenticate a particular user or an administrator.

The first storage unit 130 may also store data including a computer program or data to be utilized by a computer program corresponding to an application managed by the IDS.

If the integrated administration program, or integrated desktop solution (IDS) is executed, the first controller 150 controls the first communication unit 140 to receive device information of at least one of the external image forming apparatuses 200-1, 200-2, . . . and 200-n and stores the received device information in the first storage unit 130.

If an application which is managed by the IDS is executed, such as an application to print a document, convert a file to .pdf, or scan a document to email, the first controller 150 controls the first display unit 120 to display the management screen 20 including the contents area 24. The controller 150 may display information corresponding to the executed application by retrieving stored device information and stored user information from the device information storage area 131 and the user information storage area 132, respectively, of the first storage unit 132.

The first communication unit 140 may directly receive device information from at least one of connected image forming apparatuses 200-1, 200-2, . . . and 200-n, or the first communication unit 140 may receive status information of the image forming apparatuses 200 from the image forming apparatus server 300. The device information may be received periodically or may be received when a user executes or refreshes the IDS.

The received device information of the image forming apparatuses 200-1, 200-2, . . . and 200-n may include a predetermined file (e.g., XML) including capability information of the image forming apparatuses 200-1, 200-2, . . . and 200-n.

Figure 4:
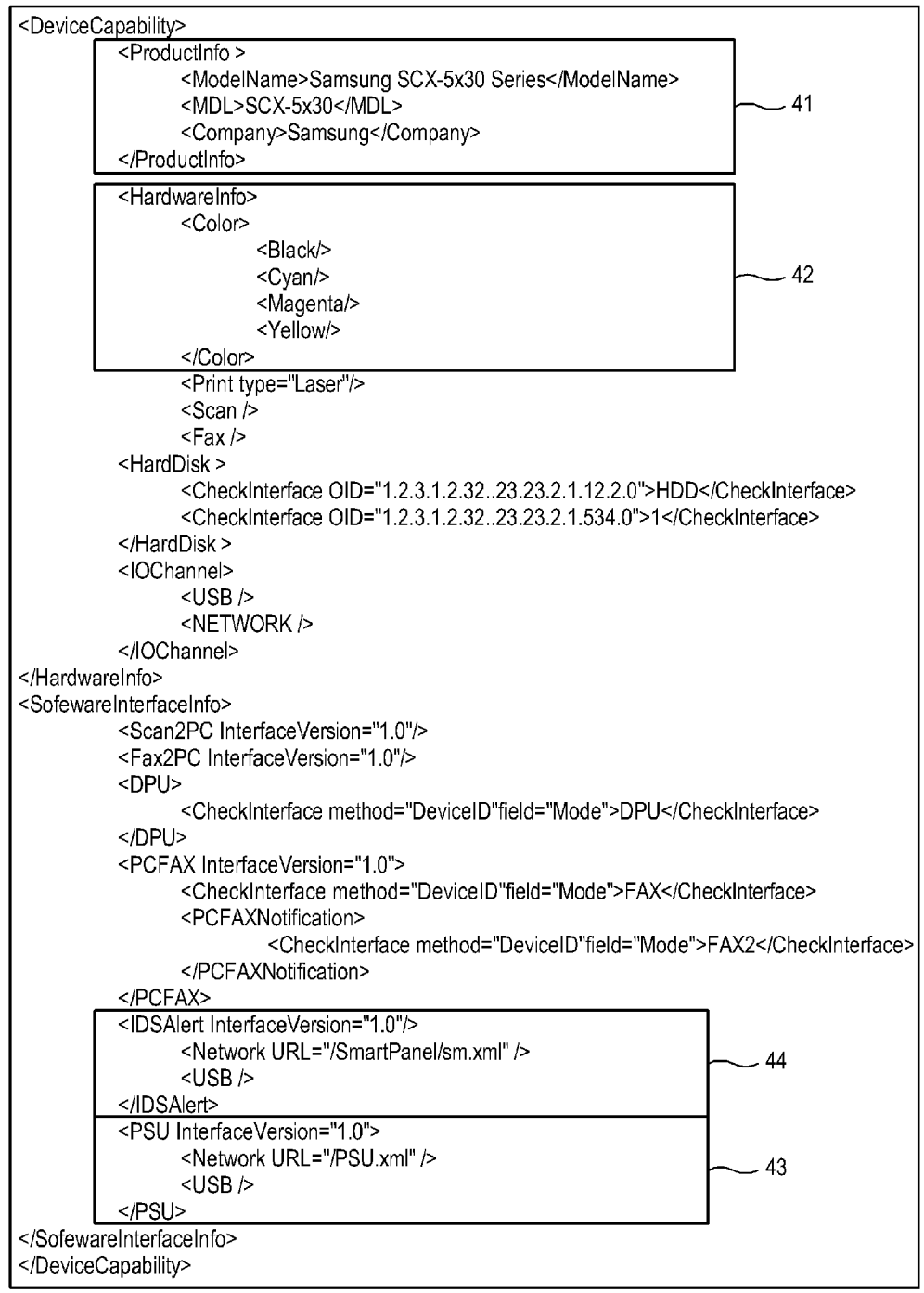
FIG. 4 illustrates an example of device information of the image forming apparatus received from the host apparatus according to an exemplary embodiment of the present general inventive concept.

FIG. 4 illustrates an example of device information of the image forming apparatus received from the host apparatus 100 according to the present general inventive concept.

As illustrated in FIG. 4, a file including capability information as received device information of the image forming apparatus may include manufacturing information 41 including a model name and a manufacturer, hardware information 42 including color, software information 43 including information of each application managed by the IDS, and alert information 44 including a preferred alert destination and method of transmitting an alert.

If the software information 43 includes printer settings utility (PSU) as illustrated in FIG. 4, the device settings icon 37 of the management screen 20 of FIG. 2 may be enabled. Then, a user may select the enabled icon 37, and set, change, and confirm the device settings of the selected image forming apparatus 33.

If a user selects the device settings icon 37, a device setting application may be executed, and the first controller 150 may retrieve the device information including the device settings from the device information storage area 131 of the first storage unit 130. The controller may then cause the display unit 120 to display the setting information in the contents area 24 of the management screen 20.

Likewise, if a user executes a printer information displaying application, the first controller 150 may retrieve status information (e.g. toner information) out of the device information stored in the first storage unit 130, and may display the status information in the contents area 24.

The first communication unit 140 may include a wired/wireless communication module which communicates with at least one of the image forming apparatuses 200-1, 200-2, . . . and 200-n and the image forming apparatus server 300 and is connected to an external device such as the image forming apparatuses 200-1, 200-2, . . . and 200-n or the image forming apparatus server 300 by a local connection or in a network using a predetermined protocol.

Figure 5:
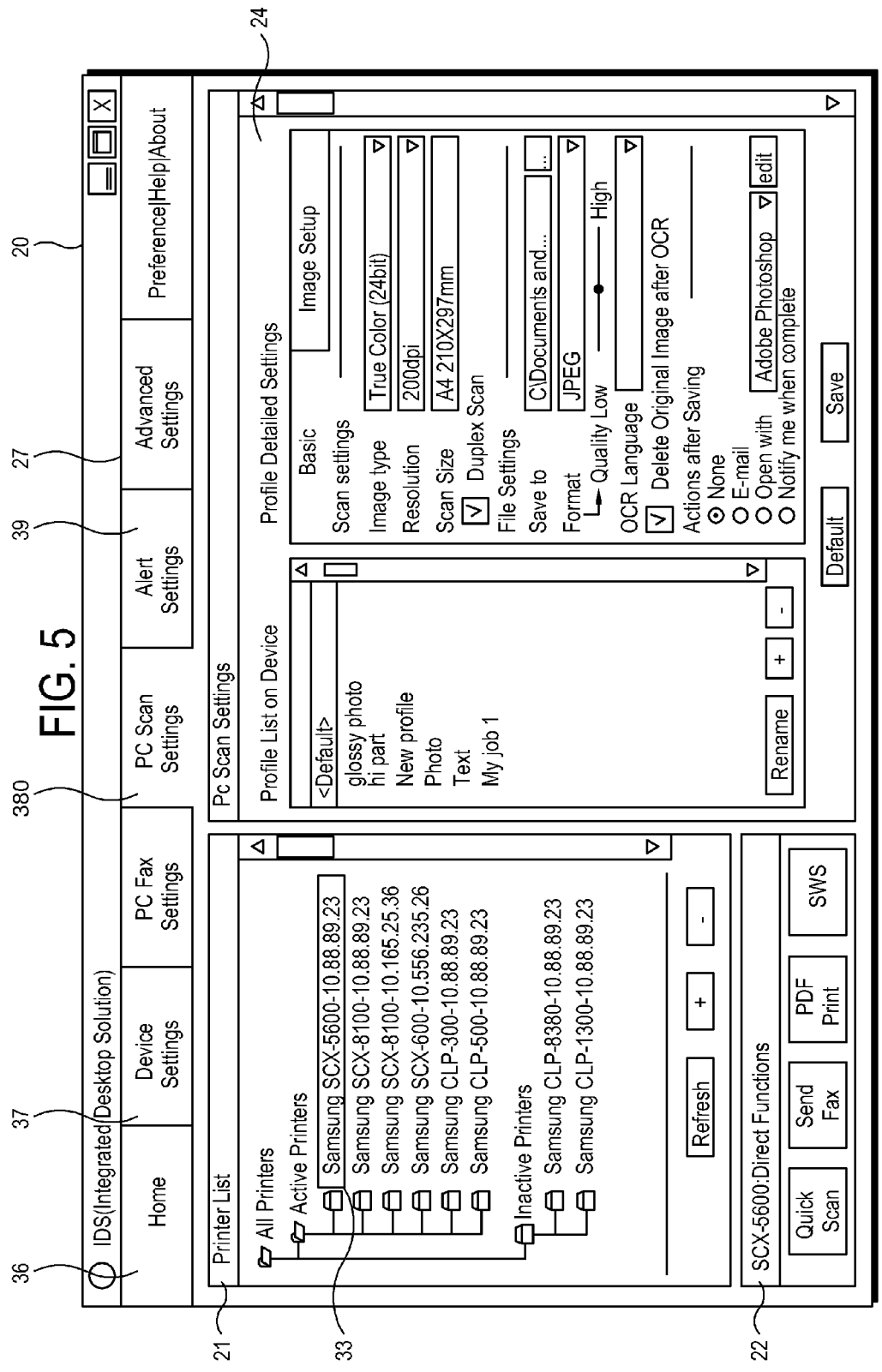
FIG. 5 illustrates an example of setting device information in the host apparatus according to an exemplary embodiment of the present general inventive concept.

FIG. 5 illustrates an example of setting device information in the host apparatus 100 according to the present general inventive concept.

As shown therein, a user may select a PC Scan Setting icon 380 from the menu item 27 of the management screen 20 and confirm and input scan setting information as device information. When the user selects the PC Scan Setting icon 380, the first controller 150 controls the first display unit 120 to display a setting screen in the contents area 24 corresponding to the scan setting selected by a user.

The first controller 150 may retrieve status information of a predetermined image forming apparatus stored in the first storage unit 130 and display the retrieved status information for the predetermined image forming apparatus in the contents area 24.

A user may input device setting information with respect to the scan setting corresponding to the displayed contents area 24. The input device setting information may be stored in the device information storage area 131 of the first storage unit 130. The stored device setting information may also be used in "scan 2 PC" or "Twain Scanner Driver" applications, which require scan setting information.

FIG. 7 illustrates an example of stored user information in the host apparatus 100 according to the present general inventive concept.

As illustrated in FIG. 7, the user information 54 may be stored in a user's account folder 53 of an operating system (OS) such as Windows and may be kept confidential from other users. All the user data 54 may be stored in one "Users" folder 53, as illustrated in FIG. 7, or each user data for each user may be stored in a different "User" folder.

The first controller 150 receives the user information 54 corresponding to each user via the first user interface unit 110 and stores the user information 54 in the user information storage area 132 of the first storage unit 130, as illustrated in FIG. 3.

Figure 8A:
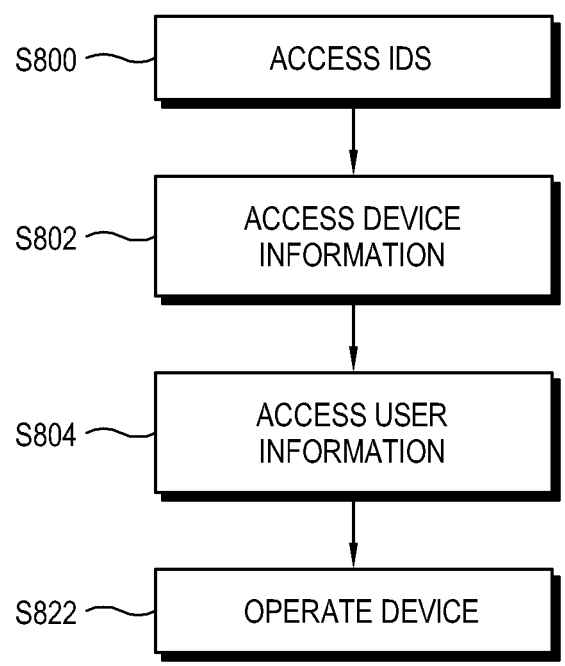
FIGS. 8A-8C illustrate an operation of storing device information and user information in the host apparatus according to an exemplary embodiment of the present general inventive concept.
Figure 8B:
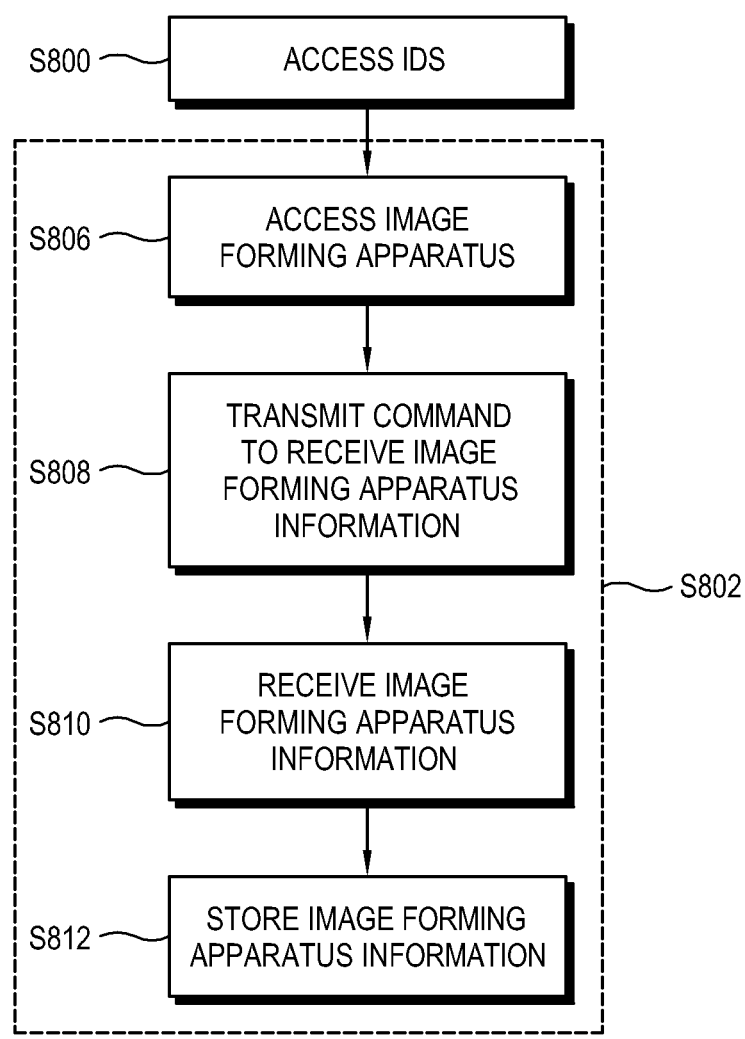
Figure 8C:
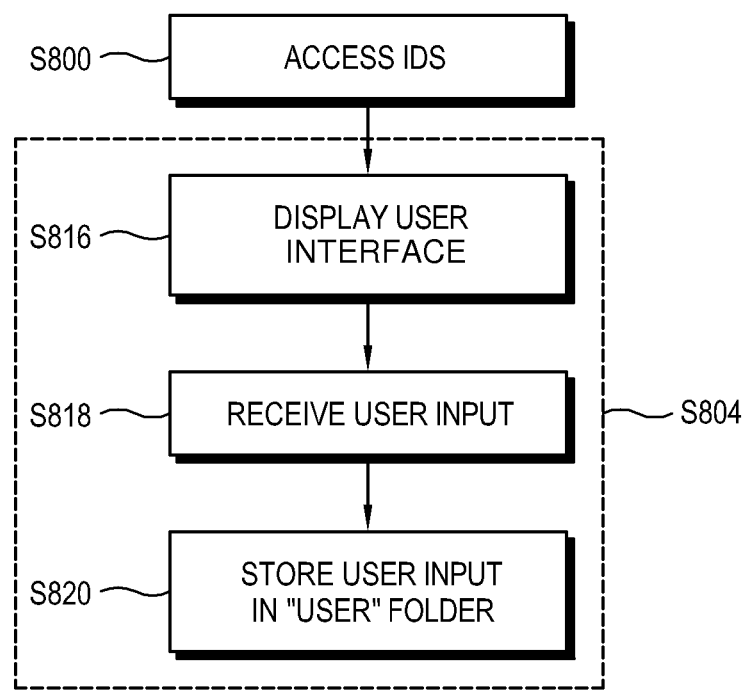

FIGS. 8A-8C illustrate an operation to store device information and user information in the host apparatus 100 according to the present general inventive concept.

As illustrated in FIG. 8A, if a user executes the IDS in operation S800, the first controller 150 accesses information about a device, or an image forming apparatus 200, in operation S802. FIG. 8B illustrates a process of accessing device information.

As illustrated in FIG. 8B, the first controller 150 may control the first communication unit 140 to access at least one of the image forming apparatuses 200-1, 200-2, . . . and 200-n in operation S806 and may transmit a command or request to obtain device information in operation S808. The first controller 150 may receive the requested device information via the first communication unit 140 in operation S810 and may store the received device information in the first storage unit 130 in operation S812. The stored device information may include status information and setting information, as illustrated in FIG. 3, and may be an XML format, for example.

The first controller 150 may compare the device information already stored in the first storage unit 130 with the received device information and may update the information stored in the first storage unit 130, as necessary. The updated device information may be reflected in the management screen 20 of the IDS, as illustrated in FIG. 2.

A user may set the user information by using the executed IDS, as illustrated in FIGS. 8A and 8C. Although FIG. 8A illustrates accessing user information after accessing device information, the user information and device information may be obtained in any order.

As illustrated in FIG. 8C, upon logging into the IDS in operation S800, the IDS may display a user interface in operation S816, such as the management screen 20 of FIG. 2. In operation S818, the user may input user information, such as an ID, password, and preferences, in response to the user interface displayed by the IDS. The user may input the information via the first user interface unit 110, for example, and the user information may then be stored in the first storage unit 130 in operation S820.

When a user requests that an operation corresponding to one of the image-forming apparatuses 200 be performed, the first controller 150 may retrieve the user information and device information stored in the first storage unit 130 to operate the image forming apparatus 200 in operation S822. In addition, the controller 150 may control the IDS to request additional information from the user via the first display unit 120 or from the image forming apparatuses 200 via the first communication unit 140 before performing the requested operation of the image forming apparatuses 200.

Figure 9:
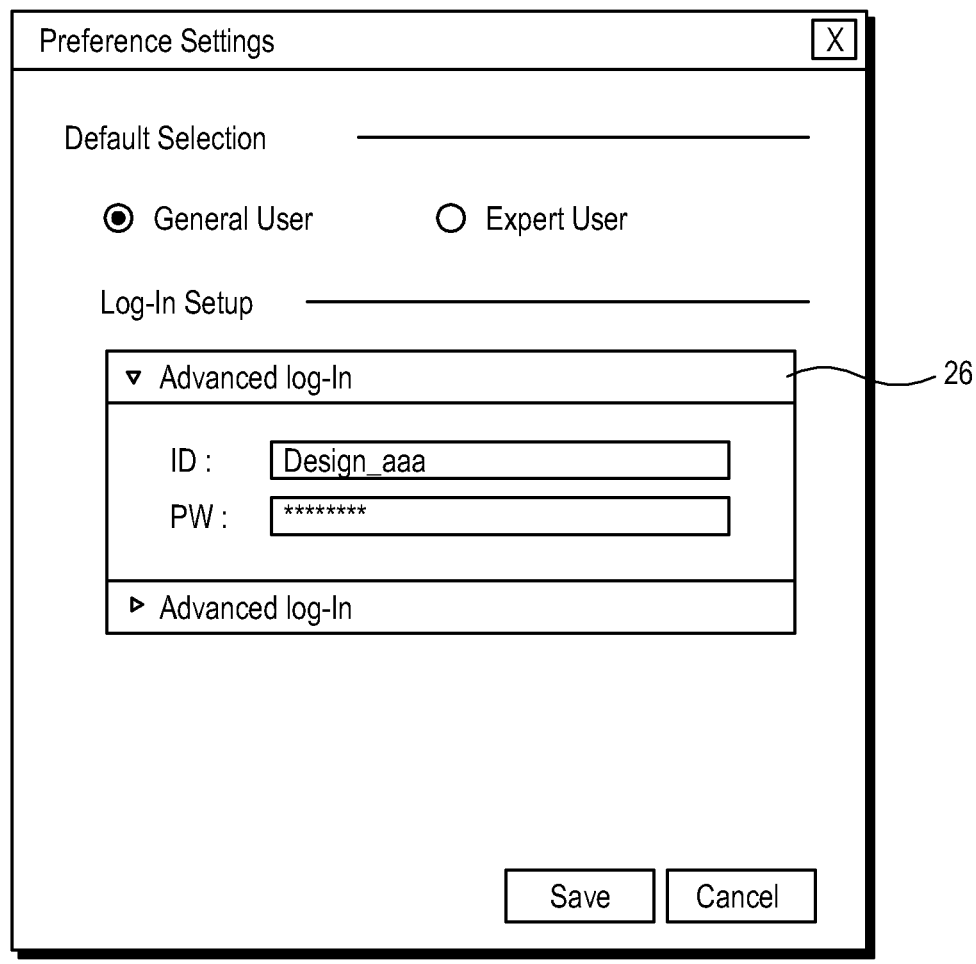
FIG. 9 illustrates an example of a user interface (UI) screen to set user information.

FIG. 9 illustrates an example of a UI screen to set the user information.

As illustrated in FIG. 9, a user may input a predetermined user ID and password and input a command to store the user ID and password when the UI displays a log-in area 26 to set the user ID and password. The input user information (ID and password) may be stored in the first storage unit 130.

The stored user information may include PC fax information, alert option information, and job accounting information as illustrated in FIG. 7.

The device information and the user information which are stored by the IDS may be loaded and used without copying and storing processes by the sub application program of the IDS. For example, a print application, a scan-to-email application, and a print-to-pdf application would not each have to separately copy and store device and user data to perform an operation of an image forming apparatus. Instead, each application may communicate with the IDS to retrieve the device and user data previously stored via the IDS in the first storage unit 130.

Accordingly, the storage space may be used more efficiently.

Figure 10:
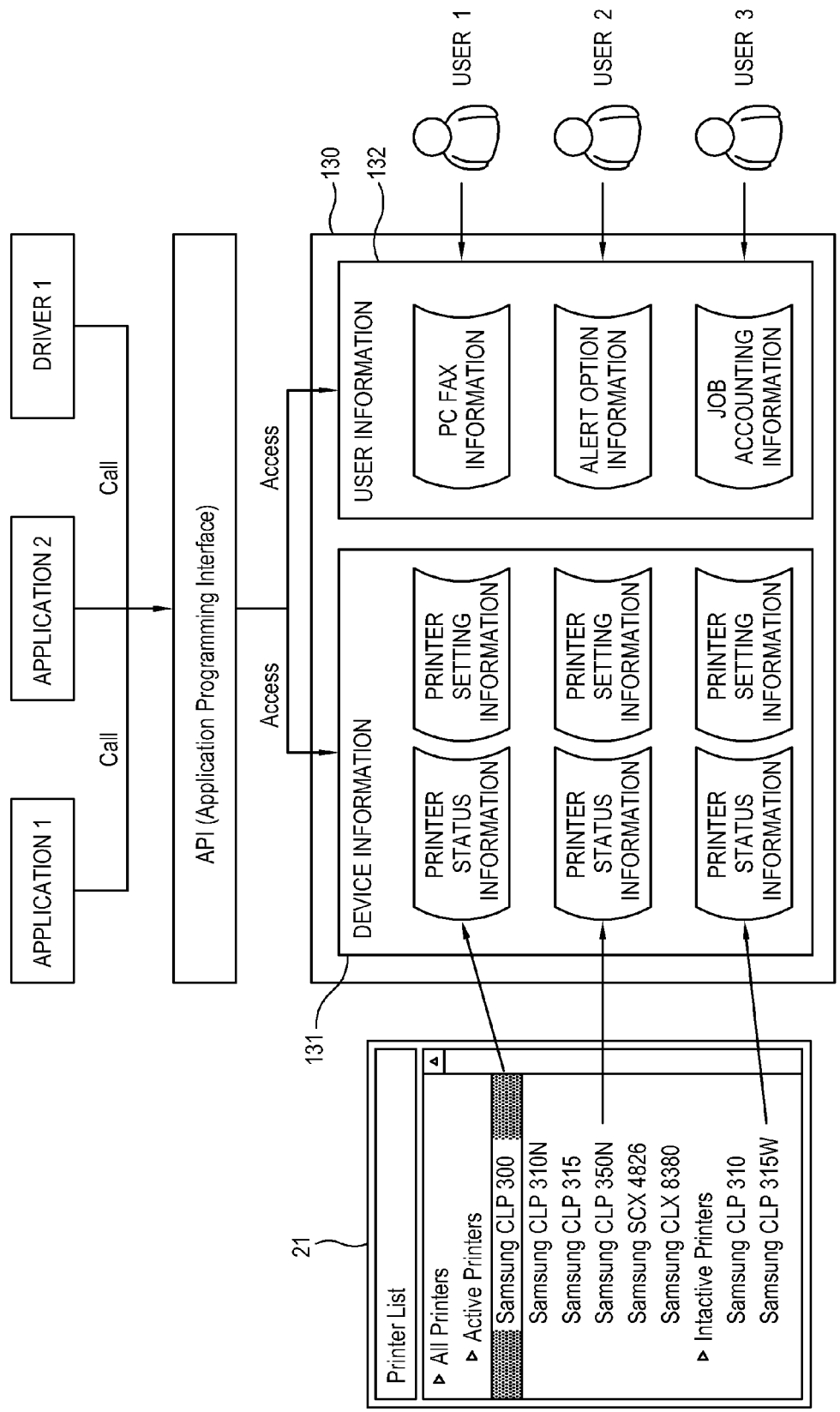
FIG. 10 illustrates a process of loading data from the host apparatus according to an exemplary embodiment of the present general inventive concept.

FIG. 10 illustrates a process of loading data from the host apparatus 100 according to the present general inventive concept.

As illustrated in FIG. 10, the first controller 150 may call an application programming interface (API) function and may load the device information and the user information through the called API function if one of applications (including a printer driver) managed by the IDS is executed. The API may be a component of the integrated administration program, or integrated desktop solution (IDS), or the API may be a separate program from the IDS to allow a variety of applications to access the device and user information 131 and 132 stored in the first storage device 130.

The IDS may include a dynamic linking library (DLL) file which provides API function.

Accordingly, a plurality of applications which are managed by the IDS may share the device information and the user information stored in the first storage unit 130.

Figure 11:
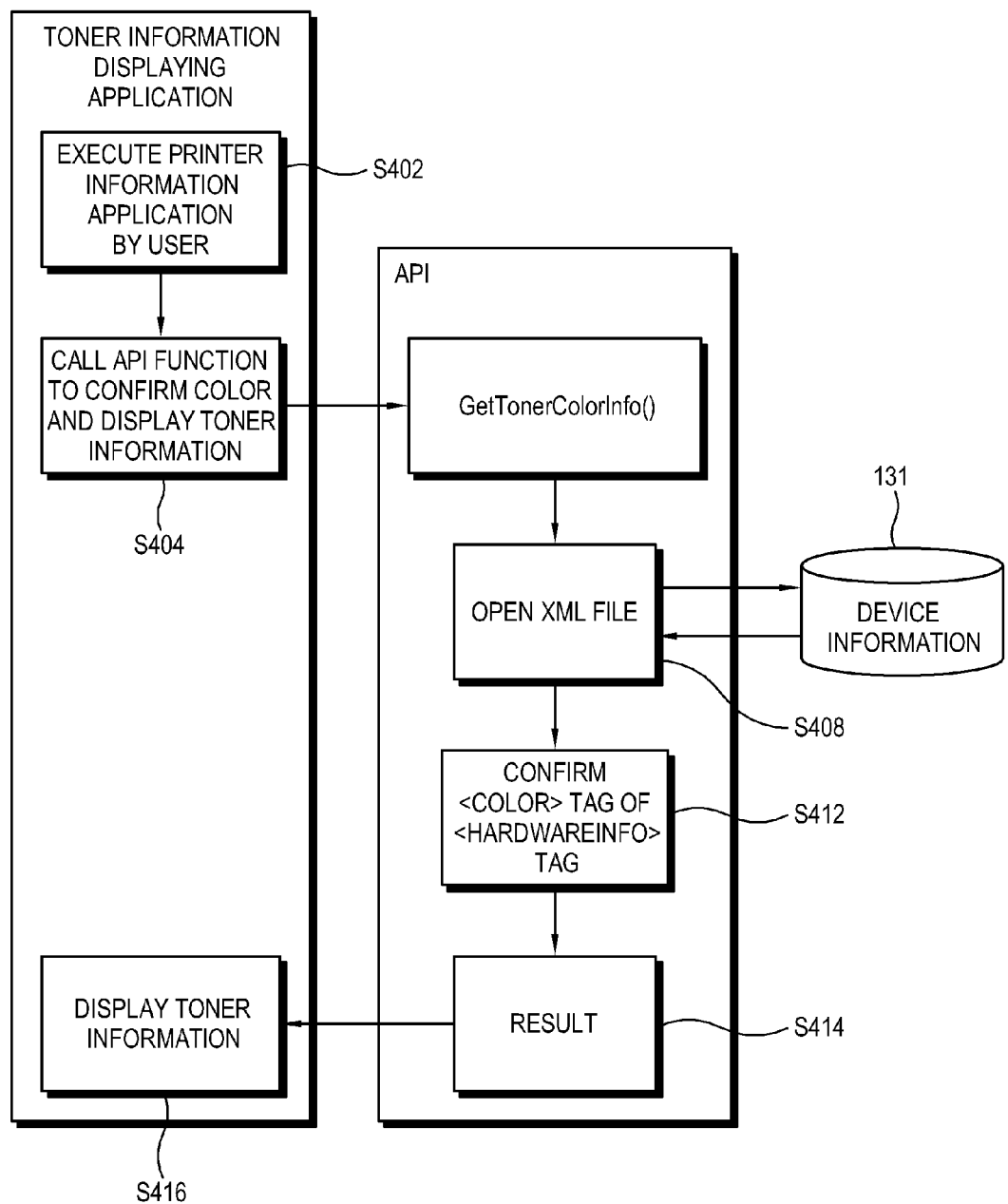
FIG. 11 illustrates an example of loading device information from the host apparatus according to an exemplary embodiment of the present general inventive concept.

FIG. 11 illustrates an example of loading the device information from the host apparatus 100 according to the present general inventive concept.

As illustrated in FIG. 11, if a user executes the IDS, the first controller 150 may execute a toner information displaying application (or printer information displaying application) in operation S402 to display status information such as toner information in the contents area 24 of the management screen 20 in FIG. 2. The first controller 150 may execute the toner information displaying application corresponding to a user's selection of the Home icon 36 from the menu item 27, for example.

If the toner information displaying application is executed, the first controller 150 calls the API function in operation S404 to confirm color to display the toner information as in FIG. 10. The API function may include GetTonerColorInfo( ) to confirm colors, for example.

In operation S408, the first controller 150 opens the XML file stored in the device information area 131 of the first storage unit 130 by using the called color confirming API, and confirms <color> tag 42 of <HardwareInfo> tag (refer to FIG. 4) in operation S412.

The XML file which is stored in the device information area 131 may include the device information received from the image forming apparatuses 200-1, 200-2, . . . and 200-*n* and stored or updated when the IDS is executed.

The API function may provide the confirmed color information to the first controller 150 in operation S414, and the first controller 150 may control the first display unit 120 in operation S416 to display in the contents area 24 the toner information per color by using the provided color information.

Figure 12:
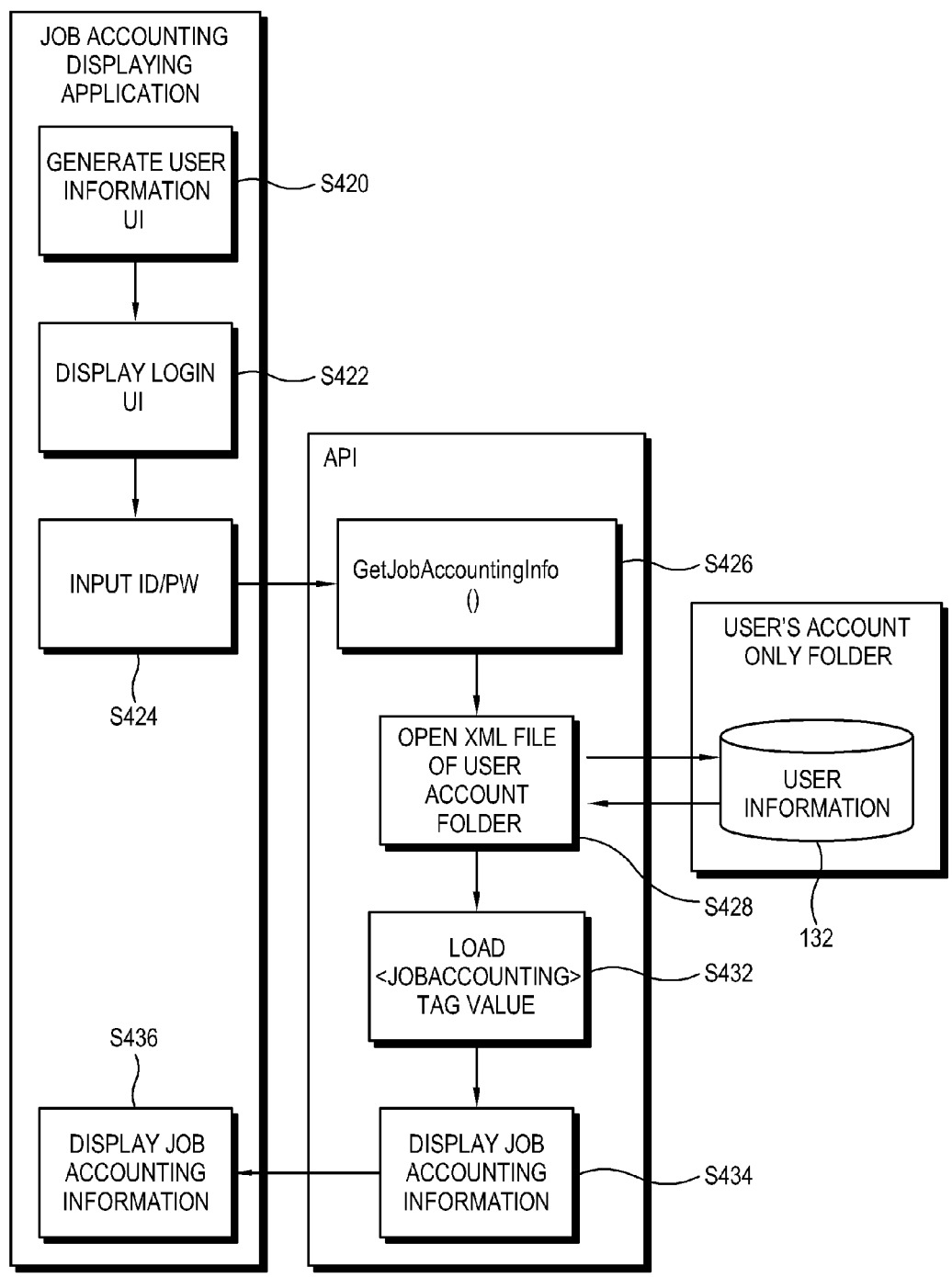
FIG. 12 illustrates an example of loading user information from the host apparatus according to an exemplary embodiment of the present general inventive concept.

FIG. 12 illustrates an example of loading the user information from the host apparatus 100 according to the present general inventive concept.

As illustrated in FIG. 12, if a job accounting displaying application is executed to confirm the job accounting information for a predetermined user, the first controller 150 may generate a user information UI in operation S420 to confirm the job accounting information and may display the login UI on the first display unit 120 in operation S422.

If a user inputs the ID and password corresponding to the displayed login UI in operation S424, the first controller 150 calls the API function to confirm the job accounting information as in FIG. 12 in operation S426. The API function may include GetJobAccountingInfo( ) to confirm the job accounting information, for example.

In operation S428, the first controller 150 opens the XML file stored in the user information area 132 of the first storage unit 130 by using the called API function and confirms and loads <JobAccounting> tag 51 (refer to FIG. 6) in operation S432.

The API function provides the loaded ID and password information to the controller 150 in operation S434. The first controller 150 compares the provided ID and password information with those input by a user. If the provided ID and password information is consistent with that input by a user, the first controller 150 controls the first display unit 120 to display the job accounting information in the contents area 24 in operation S436.

Figure 14:
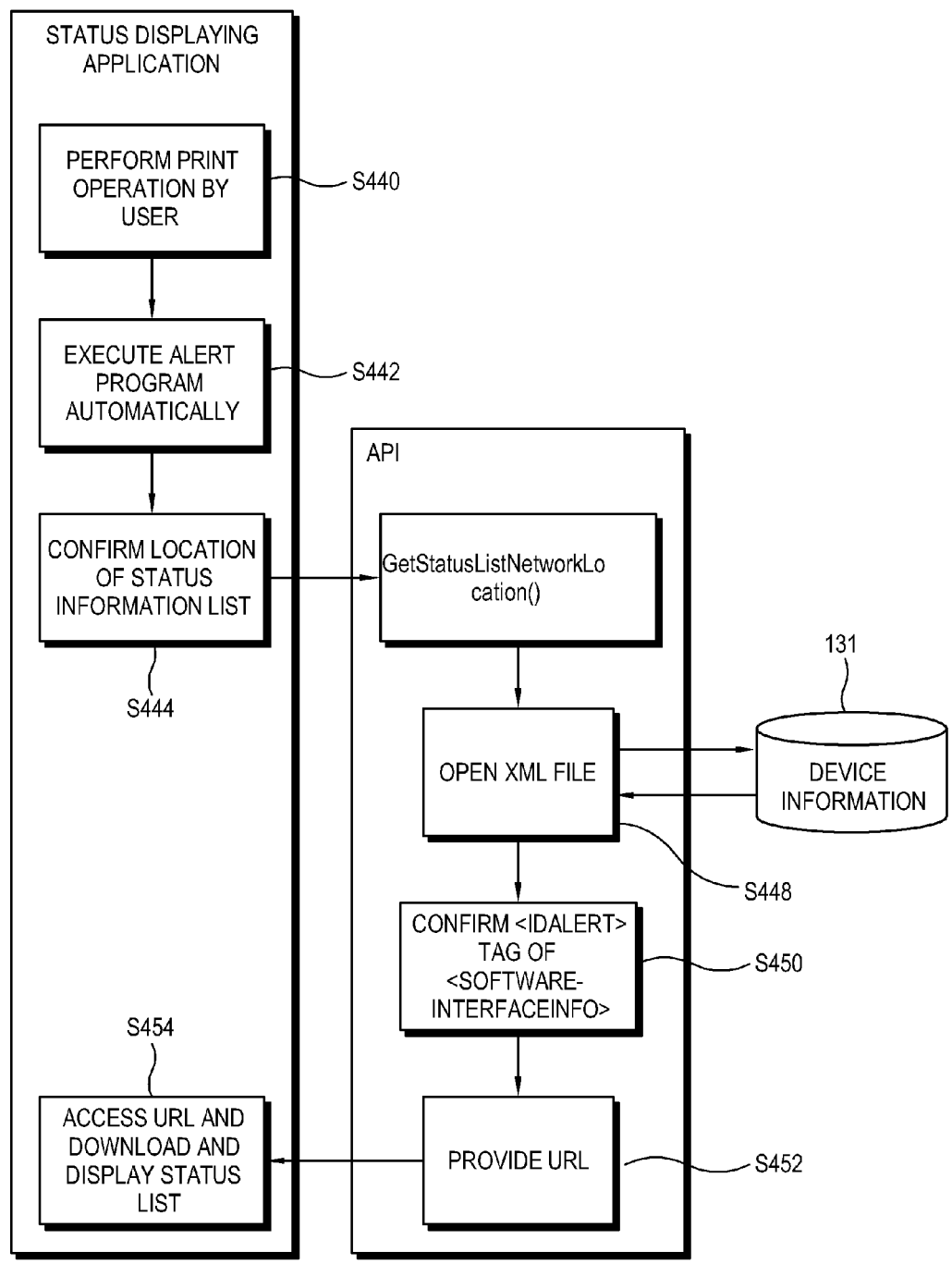
Figure 15:
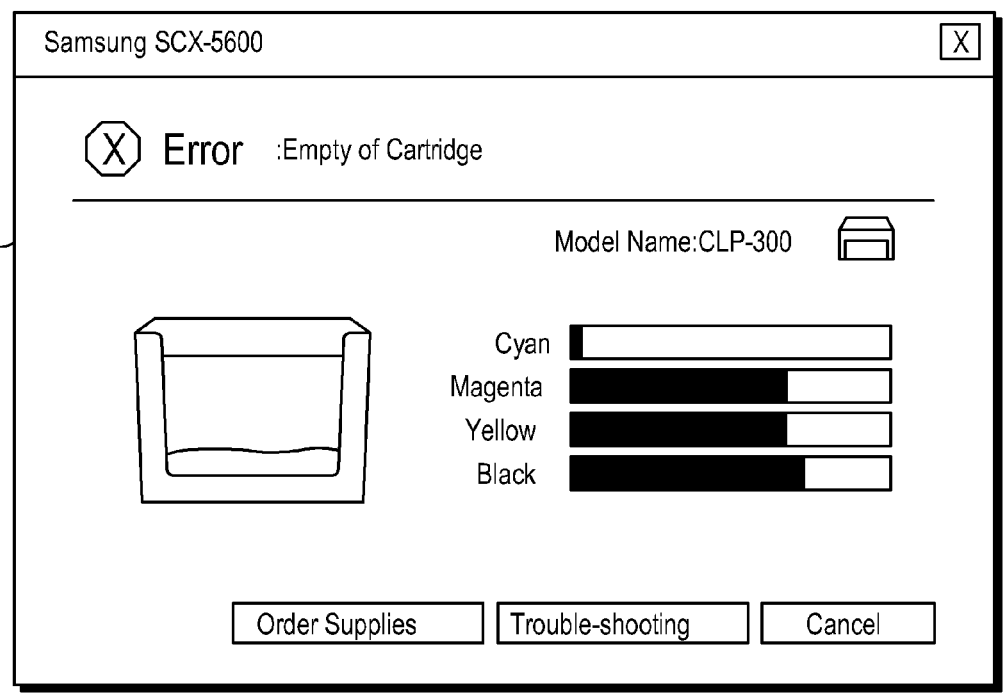

FIGS. 13 to 15 illustrate examples of loading both the device information and the user information.

As illustrated in FIG. 13, when a user selects the alert settings icon 39 from the menu item 27 of the management screen 20 in FIG. 2, the first controller 150 may control the first display unit 120 to display the print alert settings UI 28.

A user inputs a user setting value corresponding to the setting UI 28 in FIG. 13. The input value is stored in the user information storage area 132 of the first storage unit 130 as the user information.

As illustrated in FIG. 14, if a user executes the IDS and implements a print operation for a predetermined image forming apparatus in operation S440, the first controller 150 may automatically execute the alert program in operation S442 according to the alert setting value set by a user.

If the alert program is executed, the status displaying application is automatically executed. The first controller 150 confirms a location of the status information list in operation S444 and calls the API function. The API function may include GetStatusListNetworkLocation( ) to confirm the location of the status information list, for example.

In operation S448, first controller 150 may open the XML file stored in the device information area 131 of the first storage unit 130 by using the called API function, and may confirm <IDAlert> tag 44 of <SoftwareInfo> tag (refer to FIG. 4) in operation S450.

The XML file which is stored in the device information area 131 may include device information which is received from the image forming apparatuses 200-1, 200-2, . . . and 200-*n* and stored or updated when the IDS is executed.

The API function confirms and provides URL information of the <IDAlert> tag to the first controller 150 in operation S452. The first controller 150 accesses the URL and downloads the status list by using the provided URL information and determines whether to display the alert in operation S454. As illustrated in FIG. 15, the first controller 150 controls the first display unit 120 to display the alert message 25 according to the determination result. For example, the alert message may include graphic, audio, visual, and text representations or signals of toner or ink levels corresponding to different types of toner and ink.

An application that displays the alert message 25 when toner in a predetermined color is low in an image forming apparatus may initiate a process of downloading a status information list of each device from a URL of the device since the image forming apparatuses have different status information.

Referring again to FIG. 1, the image forming apparatuses 200-1, 200-2, . . . and 200-*n* include a second storage unit 230 to store print data and device information, a second communication unit 240 to communicate with the host apparatus 100, a second controller 250 to control the image forming apparatus as a whole and an image forming unit 260 to perform a print operation based on received print data. The device information which is stored in the second storage unit 230 may include status information of the image forming apparatus 200-1 and setting information set for a predetermined function by using a user manipulation unit (not shown) provided in the image forming apparatus 200-1.

The second controller 260 controls the second communication unit 240 to transmit the device information of the image forming apparatuses 200-1, 200-2, . . . and 200-*n* to the host apparatus 100 or the image forming apparatus server 300.

As illustrated in FIG. 1, if the image forming system 10 includes an image forming apparatus server 300, the image forming apparatus server 300 receives the device information from at least one of the image forming apparatuses 200-1, 200-2, . . . and 200-*n* through a third communication unit 340.

A third controller 350 stores in a third storage unit 330 the device information received from at least one of the image forming apparatuses 200-1, 200-2, . . . and 200-*n*.

The host apparatus 100 may access the image forming apparatus server 300 through the first communication unit 140 and receive device information of the image forming apparatus selected from the device list area 21 in FIG. 2.

The host apparatus 100 may transmit a management history of an application managed by the IDS to the image forming apparatus server 300 through the first communication unit 140. The image forming apparatus server 300 may store the received management history in the third storage unit 330.

The host apparatus 100 according to the present general inventive concept may store the device information and the user information by the execution of the IDS, and load and use the stored information by using the API function upon execution of the application to thereby efficiently use the storage space and improve user's convenience.

In the image forming system 10 with the foregoing configuration, an information management process of the host apparatus 100 will be described with reference to FIG. 16.

A user may execute the integrated administration program installed in the host apparatus 100 in operation S110. The integrated administration program may include an integrated desktop solution (IDS) which integrally manages at least one application.

In operation S120, the host apparatus 100 may receive the device information of at least one of the image forming apparatuses 200-1, 200-2, . . . and 200-*n* upon execution of the integrated administration program. The host apparatus 100 may receive the device information from at least one of the image forming apparatuses 200-1, 200-2, . . . and 200-*n* or the image forming apparatus server 300. The received device information may include an XML file including the capability information as in FIG. 4.

The device information received at operation S120 may be transmitted from the image forming apparatus selected by the execution of the integrated administration program or from at least one of the image forming apparatuses connected to the host apparatus 100. The received device information may include the manufacturing information 41 including a model name and a manufacturer, hardware information 42 including colors, and software information 43 including information on each application managed by the integrated administration program as the status information of a predetermined image forming apparatus.

In operation S130, the first controller 150 stores in the first storage unit 130 the received device information. The first controller 150 may compare the received device information with the device information already stored in the first storage unit 130 and may update the stored device information.

In operation S140, the host apparatus 100 may set at least one of the device information and the user information by using the executed integrated administration program. The set device information includes information set by a user with respect to the functions of the image forming apparatuses, and may include scan setting information as in FIG. 5.

The user information may include the ID and password information for a user to log in, the alert settings information to alert an error, and job accounting information to count print volume of a user as information set for a predetermined user. The operation S140 may include a user login process to set the device information or the user information.

In operation S150, a user may execute an application managed by the executed integrated administration program.

The first controller 150 may load at least one of the device information and the user information corresponding to the executed application in operation S160. The loaded device information or user information includes information needed by the application executed at operation S150 out of the device information stored at operation S130 and the device information or user information set at operation S140.

At operation S160, the first controller 150 may load the API function corresponding to the executed application and load the device information and the user information stored in the first storage unit 130 by using the called API function.

In operation S170, the first controller 150 performs a function of the application executed at operation S150 by using at least one of the device information and the user information loaded at operation S160.

At operation S170, the first controller 150 may control the first display unit 120 to display at least one of the device information and the user information loaded at operation S160 to thereby perform a function of the application.

According to the exemplary embodiment of the present general inventive concept, the host apparatus 100 stores the device information and the user information by using the integrated administration program to integrally manage the application and loads and uses the stored information by using the API function upon execution of each application to thereby efficiently use the storage space and improve user's convenience.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet via a server). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An information management method of a host apparatus which is connected to at least one image forming apparatus, the method comprising:
   executing by the host apparatus an integrated administration program installed in the host apparatus to manage a plurality of applications;
   receiving by the host apparatus device information of a plurality of image forming apparatuses using the integrated administration program;

setting user information of a plurality of users using the integrated administration program, the user information for each user being kept confidential from other users;

storing the received device information of the image forming apparatuses and the set user information in a storage unit of the host apparatus, the plurality of applications which are managed by the integrated administration program sharing the device information and the user information stored in the storage unit;

executing one of the plurality of applications managed by the integrated administration program;

loading the stored device information and/or the user information from the storage unit, the loaded device information and/or the user information corresponding to the executed application;

performing by the at least one image forming apparatus a function of the executed application by using the loaded device information and/or the user information; and displaying the loaded device information and/or the user information on a management screen, the management screen comprising a device list area to display a list of the plurality of image forming apparatuses, a contents area to display information of an image forming apparatus selected from the device list area and information of a user that is presently logged in to the integrated administration program, and an inherent function area to display an icon of at least one application performable by the selected image forming apparatus through the integrated administration program.

2. The method according to claim 1, wherein loading the stored device information comprises:

calling an application programming interface (API); and loading the device information and/or the user information by using the called API.

3. The method according to claim 1, wherein the device information comprises status information and setting information of a function of the image forming apparatus selected from the device list area.

4. The method according to claim 1, wherein the user information comprises at least one of user ID and password information, alert settings information, and job accounting information.

5. The method according to claim 1, wherein the set user information is stored in a user's account folder.

6. The method according to claim 1, wherein storing the device information comprises updating already-stored device information.

7. The method according to claim 1, wherein the executed application comprises a printer driver corresponding to a predetermined image forming apparatus.

8. The method according to claim 1, wherein the management screen further comprises a common function area to display an icon of at least one application supported by the integrated administration program regardless of a compatibility with the image forming apparatus selected from the device list area.

9. A host apparatus connected to a plurality of image forming apparatuses and having an integrated administration program installed therein, the host apparatus comprising:

a user interface unit to execute the integrated administration program and one of a plurality of applications managed by the integrated administration program and to set user information of a plurality of users using the integrated administration program, the user information for each user being kept confidential from other users;

a communication unit to receive device information of the plurality of image forming apparatuses using the integrated administration program;

a storage unit to store therein the received device information of the image forming apparatuses and the set user information, the plurality of applications which are managed by the integrated administration program sharing the device information and the user information stored in the storage unit;

a controller to control the communication unit to receive the device information upon an execution of the integrated administration program, to load the device information and/or the user information from the storage unit, the loaded device information and/or the user information corresponding to the executed application, and to control at least one image forming apparatus to perform a function of the executed application by using the loaded device information and/or the user information; and a display to display the loaded device information and/or the user information on a management screen, the management screen comprising a device list area to display a list of the plurality of image forming apparatuses, a contents area to display information of an image forming apparatus selected from the device list area and information of a user that is presently logged in to the integrated administration program, and an inherent function area to display an icon of at least one application performable by the selected image forming apparatus through the integrated administration program.

10. The host apparatus according to claim 9, wherein the controller calls an application programming interface (API) and loads the device information and/or the user information by using the called API.

11. The host apparatus according to claim 9, wherein the device information comprises status information and setting information of a function of the image forming apparatus selected from the device list area.

12. The host apparatus according to claim 9, wherein the user information comprises at least one of user ID and password information, alert settings information, and job accounting information.

13. The host apparatus according to claim 9, wherein the storage unit stores the set user information only in a user's account folder.

14. The host apparatus according to claim 9, wherein the controller updates the device information stored in the storage unit with the received device information.

15. The host apparatus according to claim 9, wherein the executed application includes a printer driver corresponding to a predetermined image forming apparatus.

16. The host apparatus according to claim 9, wherein the management screen further comprises a common function area to display an icon of at least one application supported by the integrated administration program regardless of a compatibility with the image forming apparatus selected from the device list area.

17. A method of storing image forming apparatus data, the method comprising:

executing by a host device an integrated administration program stored on the host device to control a plurality of functions of a plurality of image-forming apparatuses;

receiving by the host device the image-forming apparatus data from the plurality of image-forming apparatuses using the integrated administration program in response to a request from the integrated administration program of the host device;

setting user information of a plurality of users using the integrated administration program, the user information for each user being kept confidential from other users;

storing the image-forming apparatus data and the set user information in a storage device of the host device; and displaying the stored image-forming apparatus data and/or the user information on a management screen, the management screen comprising a device list area to display a list of the plurality of image-forming apparatuses, a contents area to display image-forming apparatus data of an image-forming apparatus selected from the device list area and user information of a user that is presently logged in to the integrated administration program, and an inherent function area to display an icon corresponding to at least one function performable by the selected image-forming apparatus through the integrated administration program.

18. The method according to claim 17, further comprising:
executing at least one function of the plurality of functions of the plurality of image-forming apparatuses managed by the integrated administration program; and
retrieving the stored image-forming apparatus data and/or the user information to execute the at least one function of the plurality of functions.

19. The method according to claim 18, further comprising:
performing the plurality of functions of the plurality of image-forming apparatuses using the integrated administration program; and
retrieving the stored image-forming apparatus data and the stored user information from the host device to execute each function,
wherein the integrated administration program retrieves the stored image-forming apparatus data and user information from a single location within the host device to execute each function.

20. The method according to claim 18, wherein
storing the image-forming apparatus data in the host device includes storing the image-forming apparatus data corresponding to each of the image-forming apparatuses in the host device.

21. The method according to claim 17, wherein the integrated administration program stores the image-forming apparatus data at a single location in memory of the host device so that each of the plurality of functions of the image-forming apparatuses accesses the image-forming apparatus data from the single location in the memory.

22. The method according to claim 17, wherein the management screen further comprises a common function area to display an icon of at least one application supported by the integrated administration program regardless of a compatibility with the image forming apparatus selected from the device list area.

23. A host device to control a plurality of image-forming apparatuses, comprising:
a data storage device to store user data and image-forming apparatus data;
a communication unit to transmit data and to receive data from the plurality of image-forming apparatuses connected to the host device using an integrated administration program;
a user interface unit to receive a user input corresponding to the user data using the integrated administration program, the user data for each user being kept confidential from other users;
a first controller to control operation of the communication unit to request the image-forming apparatus data from the plurality of image-forming apparatuses and to transmit the image-forming apparatus data and the user data to the data storage device; and
a display device to display a graphical user interface corresponding to the integrated administration program, the graphical user interface comprising a device list area to display a list of the plurality of image-forming apparatuses, a contents area to display data of an image forming apparatus selected from the device list area and information of a user that is presently logged in to the integrated administration program, and an inherent function area to display an icon corresponding to at least one function performable by the selected image forming apparatus through the integrated administration program,
wherein the data storage device stores the integrated administration program, and
the first controller uses the integrated administration program to retrieve the user data and the image-forming apparatus data from the data storage device to control the connected plurality of image-forming apparatuses to perform a plurality of functions of the connected plurality of image forming apparatuses.

24. The host device according to claim 23, wherein the first controller performs the plurality of functions of the plurality of image-forming apparatuses in response to a user interaction with the graphical user interface displayed on the display device.

25. The host device according to claim 23, wherein the data storage device stores the user data and the image-forming apparatus data at a single location in memory so that each of the plurality of functions of the plurality of image-forming apparatuses access the user data and the image-forming apparatus data from the single location in the memory.

26. The host device according to claim 23, wherein the graphical user interface further comprises a common function area to display an icon of at least one application supported by the integrated administration program regardless of a compatibility with the image forming apparatus selected from the device list area.

* * * * *